March 29, 1966
G. W. GALLOWAY ET AL
3,242,561
SEMI-AUTOMATIC FIXTURE FOR USE IN WELDING BANKS
OF ZIGZAG CONNECTED BARS TO END RINGS
Filed Jan. 22, 1957
4 Sheets-Sheet 1
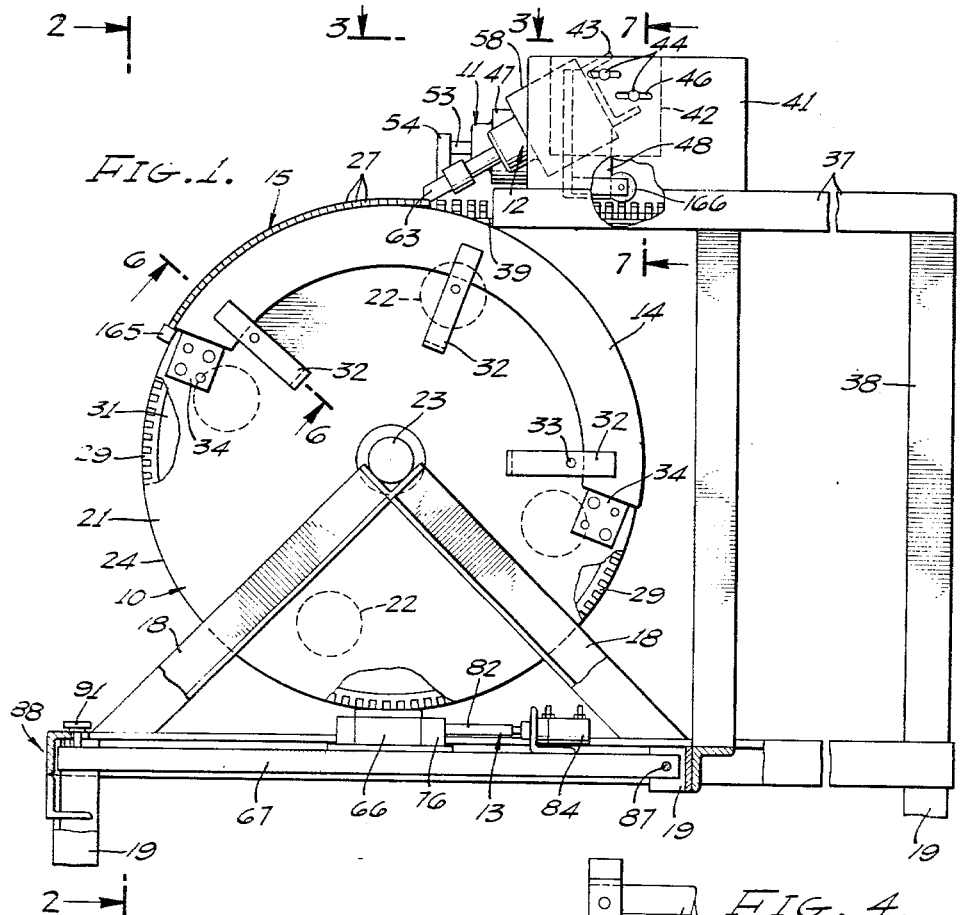
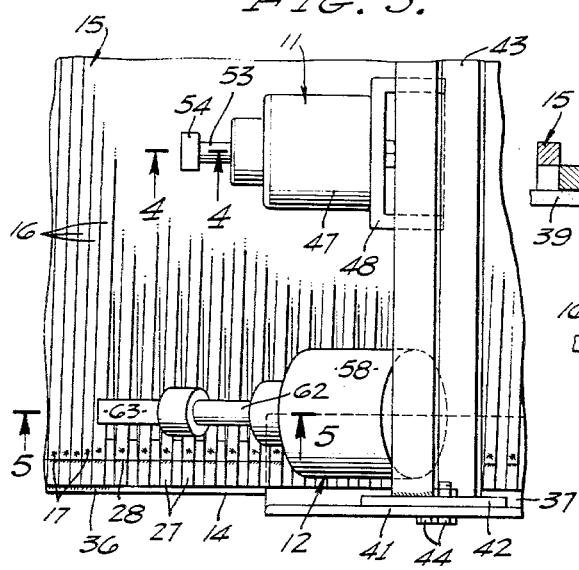
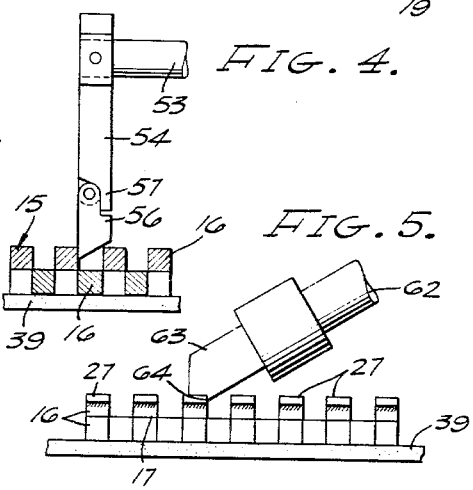
INVENTORS
GEORGE W. GALLOWAY
EUGENE L. NOOKER
BY
ATTORNEY

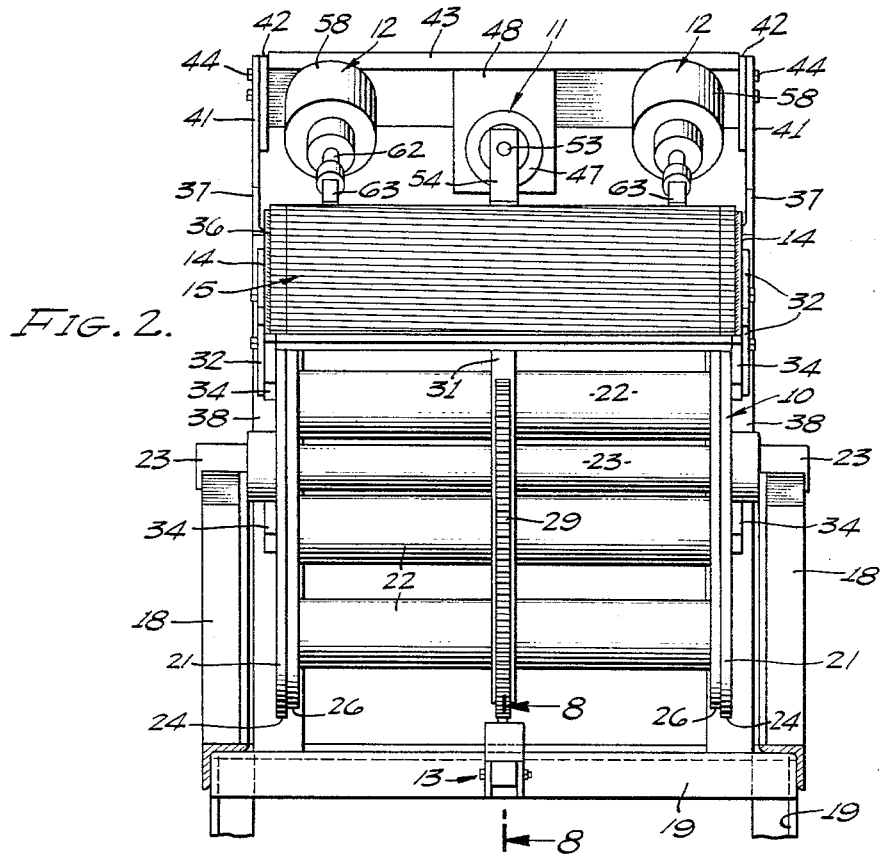
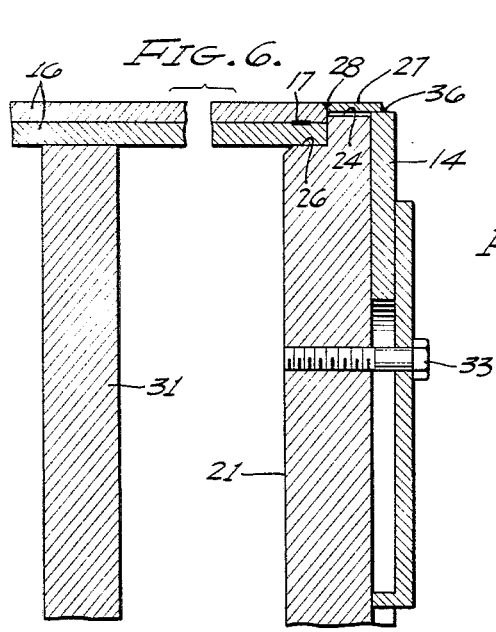
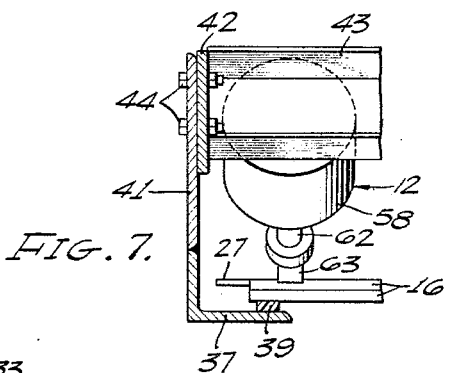

March 29, 1966　G. W. GALLOWAY ET AL　3,242,561
SEMI-AUTOMATIC FIXTURE FOR USE IN WELDING BANKS
OF ZIGZAG CONNECTED BARS TO END RINGS
Filed Jan. 22, 1957　4 Sheets-Sheet 3
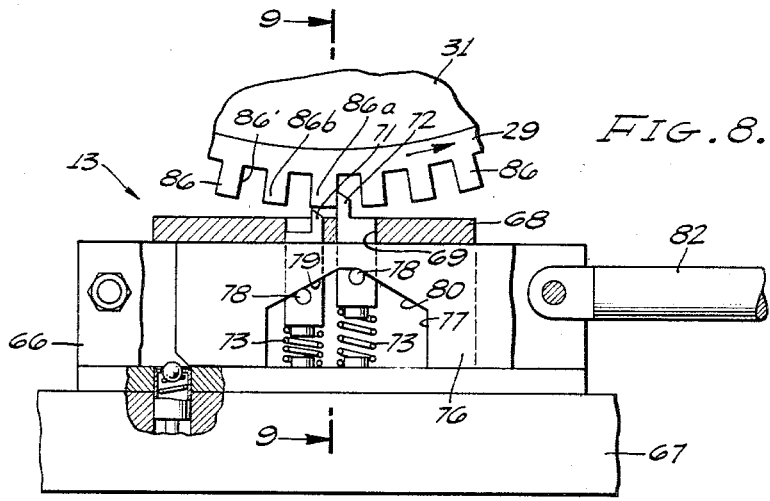
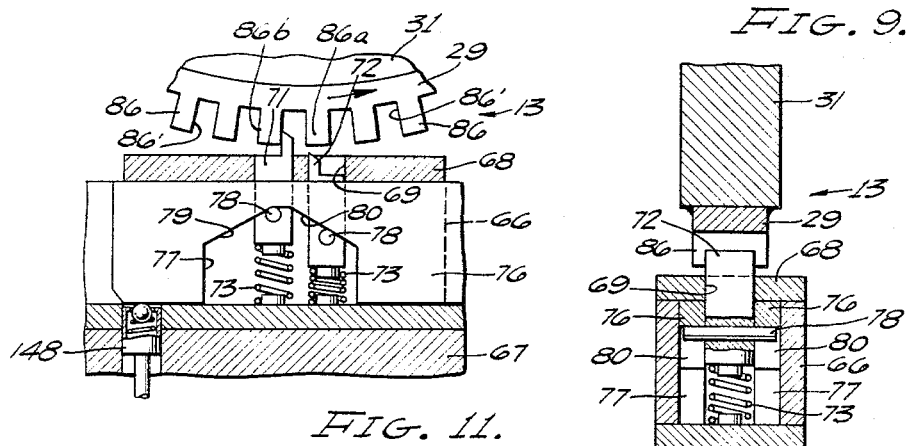
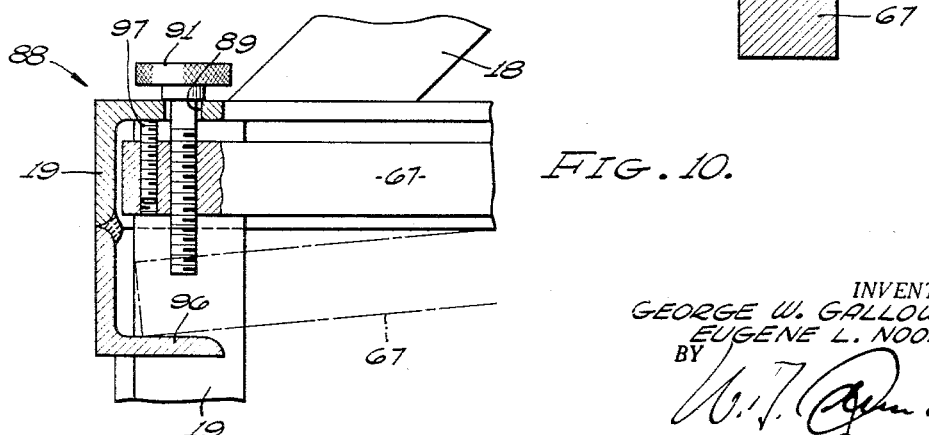
INVENTORS
GEORGE W. GALLOWAY
EUGENE L. NOOKER
BY
ATTORNEY

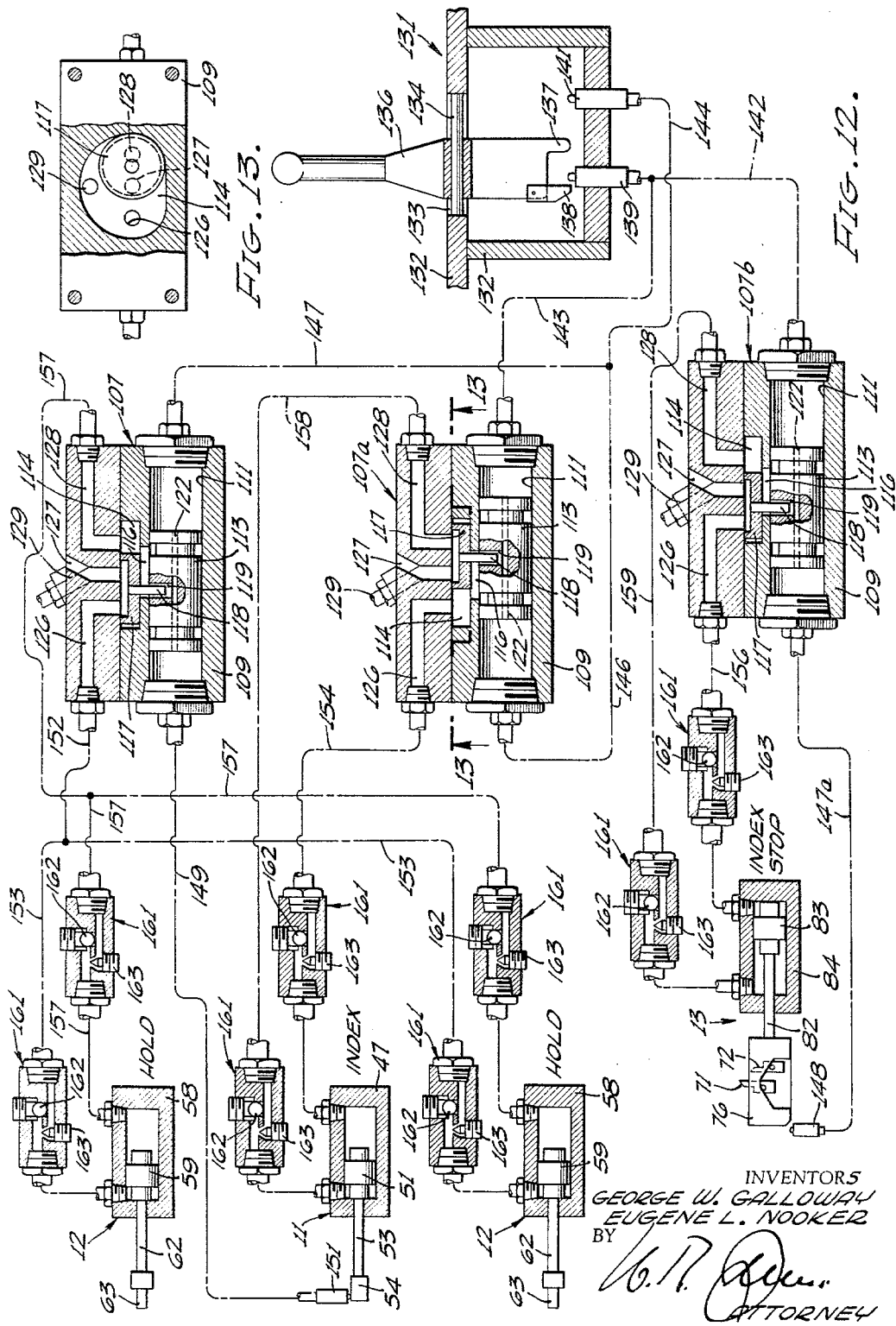

United States Patent Office 3,242,561
Patented Mar. 29, 1966

3,242,561
SEMI-AUTOMATIC FIXTURE FOR USE IN WELDING BANKS OF ZIGZAG CONNECTED BARS TO END RINGS
George W. Galloway, Altadena, Calif., and Eugene L. Nooker, Silver Spring, Md., assignors to the United States of America as represented by the Secretary of the Navy
Filed Jan. 22, 1957, Ser. No. 635,534
9 Claims. (Cl. 29—252)

This invention relates to a welding fixture, and particularly to a semi-automatic welding fixture for use in the welding of banks of zigzag connected bars to annular or semi-annular end rings. The subject matter of the present application constitutes an improvement on the subject matter of our co-pending application Serial No. 568,420, filed February 21, 1956, for Apparatus and Method for Assembling a Missile Warhead.

In the co-pending application cited above, there was shown and described a welding fixture adapted to be used during welding of banks of bars to end rings, during the production of warheads for guided missiles. The apparatus described in such application constituted a great improvement over previously known apparatuses for accomplishing the indicated purpose, but was deficient in several respects relative to speed of production and uniformity of the end product. With reference to speed of production, the previous apparatus necessitated a large amount of clamping and unclamping of various elements, and also required much manual manipulation of the joints between the welded rods or bars in order to place such joints in the proper position for welding to the end rings. The necessity for such manual operations not only retarded the assembly operation but also resulted in variations in pressure, location, etc., which adversely affected the degree of uniformity of the warheads.

In view of the above factors, it is an object of the present invention to provide a semi-automatic fixture for use in welding banks of zigzag connected bars to end rings on a high speed mass production basis, and which produces a highly standardized and uniform product.

A further object is to provide pushing and holding means which are automatically operable to shift individual bar or rod sections into welding position and to maintain them at such position during welding, in combination with index means which cooperate with the pushing means in the accurate positioning of the individual bar or rod sections.

A further object is to provide an automatic fixture incorporating novel pneumatic circuit, valve, cam and adjustment means.

These and other objects and advantages of the invention will be more fully set forth in the following specification and claims, which are to be considered in connection with the attached drawings to which they relate.

In the drawings:

FIGURE 1 is a side elevational view of a semi-automatic welding fixture constructed in accordance with the present invention;

FIGURE 2 is a front elevational view of the fixture, looking from station 2—2 in FIGURE 1;

FIGURE 3 is a fragmentary top plan view looking from station 3—3 in FIGURE 1, illustrating the push cylinder means and one hold cylinder means;

FIGURE 4 is a fragmentary vertical sectional view taken on line 4—4 of FIGURE 3, showing the pawl device which is connected to the piston rod of the push cylinder;

FIGURE 5 is a fragmentary elevational view, taken generally from station 5—5 indicated in FIGURE 3, and showing the construction of a hold device which is connected to the piston rod of a hold cylinder;

FIGURE 6 is an enlarged fragmentary sectional view taken on line 6—6 of FIGURE 1;

FIGURE 7 is a fragmentary vertical sectional view taken on line 7—7 of FIGURE 1;

FIGURE 8 is an enlarged fragmentary view, partly in elevation and partly in section, taken generally from station 8—8 in FIGURE 2 and illustrating the indexing or escapement elements which are associated with the index cylinder;

FIGURE 9 is a fragmentary vertical sectional view taken on line 9—9 of FIGURE 8;

FIGURE 10 is an enlarged fragmentary vertical sectional view of the quick release means for disengaging the index means from the cooperating gear segment to thus permit free rotation of the latter, illustrating generally the lower left corner of the showing of FIGURE 1;

FIGURE 11 is a figure corresponding generally to FIGURE 8, but showing the index device in a different position;

FIGURE 12 is a schematic diagram of the pneumatic control valves and conduits which are associated with the push, hold and index cylinders; and FIGURE 13 is a horizontal sectional view taken on line 13—13 of FIGURE 12, and looking upwardly as is indicated by the arrows.

Referring now to the drawings, and particularly to FIGURES 1 and 2 thereof, the illustrated fixture may be seen to comprise generally a movable support means in the form of a drum or wheel 10, index cylinder means 11 and hold cylinder means 12 disposed on one side of drum 10, and index stop means 13 disposed on the other side thereof. Drum 10 is adapted to have mounted thereon the generally semi-annular end rings 14 to which the bank 15 of zigzag connected bars 16 are to be welded. As is described in greater detail in the above cited co-pending application, and in the applications referred to therein, the bars 16 are rectangular in section and are provided in upper and lower layers, each corresponding pair of upper and lower bars being connected at their end portions as by resistance or arc welds 17 shown in FIGURES 3 and 6. Prior to welding to end rings 14 the bars are spaced apart slightly, but the spacing in the drawings is exaggerated.

The drum 10 is rotatably mounted on inverted V-shaped journal elements 18 which in turn are rigidly supported upon a suitable table or framework 19. The drum comprises a pair of vertically disposed, axially spaced end discs 21 which are rigidly connected to each other by a plurality of pipes or connectors 22. An axle or axis member 23 is extended axially through openings in the centers of discs 21, and is journaled at its projecting ends at the apexes of journal elements 18.

As best illustrated in FIGURE 6, the end discs each have a cylindrical peripheral edge surface 24 having a diameter slightly less than the outer diameter of the completed warhead. A recess or seat 26, in the form of an annular groove, is formed in each end disc 21 inwardly adjacent surface 24 and is adapted to receive the jointed ends of the bars or rods 16. The depth of seat 26 is such that the outermost bar 16 projects above edge surface 24 by a distance equal to the thickness of an end tab 27, the latter being welded axially outwardly of the connected bars 16 and seated on surface 24 or a slight distance therefrom. The upper surface of each end tab 27 is flush with the outermost bar surface, the tab having been welded at 28 to the outer bar 16 prior to introduction of a bank 15 of bars 16 into the present welding fixture. The width of the end tabs is equal to that of the bars, and the side surfaces of the tabs and bars are flush.

In order to support the center portions of bars 16, as well as to provide a mounting for a semi-annular gear segment 29 which forms part of index cylinder means 13, a center disc 31 is suitably mounted midway between end discs 21. The connectors 22 and axle 23 preferably extend through the center disc 31 and are suitably welded thereto.

Referring particularly ot FIGURES 1 and 6, the end rings 14 are suitably clamped to the exterior vertical surfaces of the respective end discs 21, such as by clamping elements 32 secured in place by screws 33 which extend into the end discs. Stop blocks 34 are bolted to the exterior end disc surfaces at points approximately 180 degrees from each other, adjacent the ends of gear segment 29, to effect accurate positioning of the end rings opposite the gear segment while they are clamped by elements 32. The semi-cylindrical outer edge surface of each end ring 14 is then flush with or slightly above peripheral surface 24 of the associated end disc, the arrangement being such that each end tab 27 fits over such outer edge surface of the end ring 14 and may be secured thereto as by an arc weld 36 shown best in FIGURE 6. In this connection it is pointed out that the tabs 27 do not extend clear to the outer vertical surface of the end ring, but terminate at the mid-portion of the peripheral edge surface thereof so that weld 36 may be of the fillet type.

A pair of parallel feed rails 37, illustrated as taking the form of angle irons, are mounted horizontally above support table 19 such as by vertical legs or connectors 38. The rails 37 are spaced apart a distance somewhat greater than the length of each bar 16 and associated tabs 27 (FIGURE 7), and have suitable resilient pad strips 39 mounted thereon for sliding support of the jointed ends of bars 16. The pad strips 39 are preferably formed of a suitable synthetic substance such as Teflon. Feed rails 37 being disposed tangentially of the upper side of drum 10, it follows that a bank 15 of zigzag connected bars 16 may be first mounted on the rails 37 and then slid onto the drum by operation of the index, or push, cylinder means 11 next to be described.

The index, or push, cylinder means 11, and also the hold cylinder means 12, are supported by upstanding ears or side plates 41 which are welded to the upper edges of angle irons 37 (FIGURE 7), and have adjustably connected thereto end plates 42 which are welded to the ends of a support channel 43. More particularly, bolts 44 are extended through end plates 42 and through slots 46 (FIGURE 1) in ears 41, so that upon loosening of bolts 44 the support channel 43 and associated elements 11 and 12 may be adjusted in position.

The push cylinder means 11 comprises a double-acting cylinder 47 which is rigidly connected at one end to a suitable bracket 48 welded at the center of support channel 43. As shown in FIGURE 12, the piston 51 in push cylinder 47 is provided with a piston rod 53 which connects, as best shown in FIGURE 4, to a downwardly extending crank 54 having pivotally connected at its lower end a pawl or detent-like element 56. Pawl 56 is restrained by a stop 57 against pivotal movement upon shifting of piston rod 53 and crank 54 to the left as viewed in FIGURES 1 and 4, but is permitted pivotal movement upon return shifting of these elements (to the right). The lower end of the pawl is pointed to permit insertion thereof between two adjacent bars 16 in the upper bar layer.

From the above it will be understood that shifting of piston 51, rod 53, crank 54 and pawl 56 to the left, as viewed in FIGURES 1, 4 and 12, causes pawl 56 to press against the side of a single bar or rod 16 and thus shift bank 15 to the left. This, in turn, effects rotation of drum 10 counterclockwise as viewed in FIGURE 1. Because of the operation of stop cylinder means 13 which will be described subsequently, such counterclockwise drum rotation is only permitted through a predetermined small angle, after which the push cylinder 47 is reverse-operated to effect return movement of the piston 51 and connected parts. Pawl 56 is then permittted clockwise rotation, as viewed in FIGURE 4, and slides over the upper bar 16 to the right thereof until it drops into the gap between such upper bar 16 and the one adjacent thereto. In the described manner, therefore, bars are fed from their feed rails 37 onto the drum 10, while the latter is rotated a small amount.

After the bar feeding operation described above, the drum 10 is held against further counterclockwise movement by stop means 13. Hold cylinder means 12 are then operated to bring the jointed ends of a single bar into close engagement with the jointed ends of the next bar to the left thereof as viewed in FIGURE 5, so that end tabs 27 may be welded to end rings 14 in the desired closely associated relationship with end tabs previously welded thereto. The hold cylinder means 12 are provided at opposite ends of the stationary support channel 43, but for purposes of simplicity of description only the one to the right in FIGURE 2 will be described. The hold cylinder means 12 are identical, however, and have been given like numerals.

Each hold cylinder means 12 comprises a double-acting hold cylinder 58 which is rigidly connected to support channel 43 and has mounted therein a piston 59 (FIGURE 12). The hold cylinder is inclined downwardly, as distinguished from push cylinder 47 which is horizontally arranged, so that the end of piston rod 62 of the hold cylinder approaches the bars 16 at about the same location as crank 54 of the push cylinder means. An end element 63 having a catch portion 64 (FIGURE 5) is secured to the end of piston rod 62, and is adapted to engage the upper portion of the vertical side of a bar 16. It follows that operation of the hold cylinder 58 to shift piston 59 and the connected piston rod 62 and end element 63 downwardly and to the left, in FIGURES 1 and 5, will cause the catch portions 64 to shift the jointed bar ends to the left and into abutment with the jointed bar ends previously welded to the end ring 14 by means of tab 27. Return shifting of these elements operates to move the end element 63 and its catch portion 64 upwardly and to the right, so that there will be no interference with the operation of push cylinder means 11 during subsequent steps in the operation.

The hold cylinder means 12 may, if desired, operate upon the same bar 16 as was pushed to the left by index cylinder means 11 immediately prior to hold cylinder operation. Alternatively, index cylinder means 11 may be disposed to operate upon a bar 16 a number of bars to the rear (right) of the one against which the hold cylinder means 12 are pressing and which is being welded, as shown in FIGURE 3.

Proceeding next to a description of the stop cylinder means 13, an elongated rectangular housing 66 is fixedly mounted on a horizontal support bar 67, the latter forming part of a quick release or free-wheeling mechanism to be described subsequently. The upper wall 68 of housing 66 is formed with two openings 69 which slidably receive two pawls or detents 71 and 72, the pawls being adapted to engage the teeth of gear segment 29. Pawls 71 and 72 are spring biased upwardly by compression springs 73, the construction being such that they assume an upper position in engagement with gear segment 29 except when held downwardly by a cam device next to be described.

The cam device comprises a pair of corresponding parallel cam plates 76 having cam openings 77 formed therethrough for the purpose of receiving cam follower pins 78 provided on the pawls 71 and 72. The portions of the cam plates 76 at the upper edges of openings 77 are upwardly convergent, having upwardly inclined edge portions 79 and 80 which meet at an approximate point, and against which the cam follower pins 78 are urged by springs 73. The cam plates 76 are adapted to be shifted horizontally in housing 66 by means of a piston rod 82 which connects to a piston 83 (FIGURE 12) within a double acting cylinder 84 mounted on support bar 67 (FIGURE 1).

The relative positioning of the pawls 71 and 72 is such that when they are moved simultaneously to opposite positions, one upper and one lower, the gear segment 29 and thus drum or wheel 10 will be permitted to rotate counterclockwise a distance corresponding to one tooth 86 of the gear segments. The stop device 13 operates as an escapement means, under the control of cylinder 84, to accurately position a new bar 16 in the same position as one just welded to the end rings. It will be understood that teeth 86 are preferably rectangular and of the same shape and size as notches 86' therebetween, the arcuate width of teeth 86 being one-half of the width of bars 16. It is also pointed out that the distance between the leading faces of pawls 71, 72 corresponds to the width of teeth 86.

When the parts are in the positions shown in FIGURE 8, cam follower pin 78 of pawl 72 is at the upper end of the inclined cam edge surface 80, and is disposed in engagement with the right side of one gear tooth 86a to prevent counterclockwise rotation of the drum 10. At the same time, the cam follower pin 78 of the second pawl 71 is at a low portion on the other cam edge surface 79, so that the pawl 71 is held downwardly against the bias of its spring 73 and is clear of the gear segment. Upon operation of cylinder 84 to shift the piston rod 82 and connected cam plates 76 to the left until the position of FIGURE 11 is reached, the cam follower pin for pawl 72 is compelled to move downwardly by the cam edge surface 80, whereas the cam follower for pawl 71 is permitted to move upwardly by the cam edge 79. The positions of the pawls 71 and 72 are thus reversed, and the tooth 86a initially held by pawl 72 is released at approximately the same time that the next adjacent tooth 86b is engaged and held by pawl 71. Return shifting of cam plates 76 (to the right) permits, in like manner, the drum to rotate an additional gear tooth. The drum is thus permitted to index counterclockwise the precise distance required for welding tabs 27 of the next bar 16 to end rings 21, the actual indexing being accomplished by the extension of indexing cylinder 11.

The quick release means for disengaging both pawls 71 and 72 from gear segment 29 when it is desired to permit free rotation of drum 10 will next be described, and comprises a pivot means such as a pin 87 (FIGURE 1) adapted to pivotally connect support bar 67 to table or support 19. The other end of the support bar, illustrated at the left end thereof as viewed in FIGURE 1, is provided with a latch mechanism 88 adapted not only to completely disengage the pawl teeth from gear segment 29 but also to adjust the degree of engagement thereof to the desired value.

The latch mechanism 88 (FIGURE 10) comprises a hole 89 formed in a horizontal portion of table or framework 19 and adapted to receive the upper threaded end of a bolt 91. The lower end of bolt 91 is threaded into the end of support bar 67. When the bolt 91 is turned in the appropriate direction, the support bar 67 is shifted downwardly about pivot pin 87 (FIGURE 1) from its generally horizontal position to the inclined position shown in phantom lines in FIGURE 10. Such pivotal movement is stopped by an angle-shaped stop member 96, which is welded to table 19, but not until the pivotal movement has been sufficient to completely clear the pawls 71 and 72 from gear segment 29.

A stop screw 97 threaded through the end of support bar 67 adjacent bolt 91 is adapted to come into stopping engagement with the illustrated horizontal portion of table 19 when the pawls 71 and 72, in their extreme positions, are properly adjusted to permit rotation of the drum to the desired stations during each operation of index stop means 13.

THE PNEUMATIC CONTROL CIRCUIT

Referring to FIGURES 12 and 13, the pneumatic circuit means for controlling the various cylinder means 11–13 will next be described. The pneumatic circuit includes three identical four-way valves 107, 107a and 107b. Only valve 107 will be described in detail, but the components of valves 107a and 107b will be given the same reference numerals.

Valve 107 comprises a casing 109 having a large cylindrical passage 111 therethrough, the latter slidably receiving a spool 113. A relatively flat chamber 114 is formed in casing 109 above passage 111, and communicates with passage 111 by means of an elongated slot 116. A cup 117 is mounted in the flat chamber 114 and is sealingly connected at its bottom with a downwardly extending stem 118 which projects through slot 116 and into spool 113. The rim of cup 117 is in sealing and sliding engagement with the upper portion of casing 109, but the fit between stem 118 and its vertical passage 119 through spool 113 is a loose one so that air may flow around the stem. This air flows into a relatively small diameter longitudinal passage 122 in the spool 113, and thus to both ends of passage 111.

Three passages 126–128 provided in the upper portion of casing 109 communicate with the flat chamber 114 at equally spaced points along a line. The spacing between the outlets from passages 126–128 into chamber 114 is such that two adjacent outlets communicate with the interior of cup 117 in either extreme position of the cup 117 and spool 113, and the remaining outlet communicates with the chamber 114 outside the cup. A fourth passage 129 through casing 109 communicates with chamber 114 to the front of cup 117, and is never registered with the cup.

The pneumatic circuit also includes a manually operated control valve 131 having a generally rectangular casing 132, the latter being provided with a longitudinal slot 133 in its upper wall. Slidably mounted on a bar 134 in slot 133 is a control handle 136 having a downwardly extending ear 137 at its lower, right corner as viewed in FIGURE 12. The lower left corner of the control handle has pivotally mounted thereon an actuator 138 which is so constructed that it may pivot clockwise relative to the handle but may not pivot counterclockwise away from the illustrated vertical position.

A pair of bleed poppets 139 and 141 are fixedly mounted in the lower wall of casing 132 beneath slot 133, and in spaced relation relative to each other. Poppet 141 is depressed and opened by ear 137 when the control handle 136 is in its extreme right position permitted by slot 133. Bleed poppet 139 is opened by an actuator 138 upon movement of the handle 136 to the left, to the extreme left position permitted by slot 133, but is not actuated upon movement of the handle to the right since actuator 138 then merely pivots clockwise.

Operation of either of the valves 139 or 141 effects bleeding of air from various portions of four-way valves 107, 107a or 107b as will be described subsequently.

Proceeding next to a description of the various air lines between the valves, cylinders, etc., bleed poppet 139 of control valve 131 is connected through a line 142 to the right end of passage 111 of four-way valve 107b. Similarly, poppet 139 is connected through line 143 to the right end of passage 111 of valve 107a. The poppet 141 is connected through lines 144 and 146 to the left end of passage 111 of valve 107a, and is also connected through lines 144 and 147 to the right end of passage 111 of valve 107.

The left end of passage 111 of valve 107b is connected through a line 147a to a bleed poppet 148, the latter being operated to open position by index means 13 when the latter is in its extreme left position as viewed in FIGURES 1, 8 and 12. The left end of passage 111 of valve 107 is connected through a line 149 to a bleed poppet 151 operated by push cylinder means 11 when the latter is in its extreme left position, as viewed in the FIGURES 1 and 12.

Passages 129 and 127 of the four-way valves 107, 107a and 107b are connected, respectively, to a suitable source of air pressure and to the ambient atmosphere. Passage 126 of valve 107 is connected through lines 152 and 153 to the left ends of hold cylinders 58. Passage 126 of valve 107a is connected through line 154 to the right end of push cylinder 47, whereas passage 126 of valve 107 b is connected through line 156 to the right end of index cylinder 84.

Passage 128 of valve 107 is connected through lines 157 to the right ends of hold cylinders 58. The corresponding passage 128 of valve 107a is connected through line 158 to the left end of push cylinder 47, and passage 128 of valve 107b connects through line 159 to the left end of index cylinder 84.

The air line leading to or from each end of each cylinder 47, 58 or 84 has interposed therein a combination check and control valve 161. Such valves each include a ball element 162 adapted to permit free flow of air in the direction which effects unseating of the ball, and a parallel-connected needle valve element 163 adapted to permit controlled flow of air in the direction opposite to the one which effects unseating of the ball. The function of these valves will be described subsequently, in connection with the description of the operation of the apparatus.

OPERATION

To summarize the operation of the welding fixture of the invention, let it be assumed that latch mechanism 88 is initially released to permit downward pivoting of support bar 67 for index cylinder means 13 until pawls 71 and 72 are out of engagement with gear segment 29. The drum 10 is then freely rotatable on its axis 23, and a pair of end rings 14 may be readily clamped in position by clamps 32 and with their ends abutting stop blocks 34. A two-layer bank 15 of zigzag connected bars 16, having end tabs 27 previously welded thereto, is then mounted on feed rails 37. The drum 10 is then rotated until the left stop blocks 34 (FIGURE 1) are in uppermost position, and the forwardmost bar 16 and its tabs 27 (or a special wedge bar, not shown) are fed from rails 37 until the tabs 27 rest on the extreme left end portions of end rings 14. A stop bar 165, welded to the end discs adjacent the stop blocks as shown in FIGURE 1, facilitates the initial positioning operation. Such manual feeding or initial adjusting of the bank 15 of bars or rods is possible, when hold cylinder means 12 are retracted, since the pawl or detent element 56 (FIGURE 4) of push cylinder means 11 pivots out of the way of bars 16 when they are slid forwardly therebeneath. During and after such feeding, bank 15 is held down on rails 37 by means of a hold down roller 166 (FIGURE 1) welded on bracket 48.

Arc welds 36 (FIGURE 6) are then made between the two forward end tabs and the end edge portions of rings 14. Also, support bar 67 is pivoted upwardly until pawl element 72 engages gear segment 29, and latch mechanism 88 is secured. If necessary, the bolts 44 are loosened and the positions of the indexing and hold cylinder means are adjusted and relocked in adjusted position.

During the above-described initial operations, the control handle 136 (FIGURE 12) is in its position at the extreme right end of slot 133. Handle 136 is then shifted to the left end of slot 133 allowing poppet 141 to close and effecting momentary depression and opening of bleed poppet 139. This, in turn, effects bleeding of air through lines 142 and 143 from the right ends of passages 111 in four-way valves 107a and 107b. Because of such bleeding, the air pressure at the right ends of passages 111 is lower than the air pressure at the left ends of such passages, which will result in pressure shifting of the spools 113 of valves 107a and 107b to their extreme right positions (as illustrated in the drawing in connection with valve 107a). The spools will then remain in these right-shifted positions until air is bled from the opposite (left) ends of passages 111, and at a time when there is no bleeding from the right ends thereof.

In connection with the operation of each four-way valve 107, 107a or 107b, it is to be understood that air continuously flows from the unshown air pressure source into passage 129 and thus into chamber 114. It then flows through slot 116 beneath cup 117 and around stem 118 through passage 119 into the longitudinal spool passage 122 leading to both ends of large passage 111. Since air is thus continuously fed through the relatively small diameter passage 122 into both ends of large passage 111, it follows that the spool 113 will be pressure-shifted to the end of large passage 111 from which air is bled.

When the spool of valve 107b is shifted to the right as stated, cup 117 thereof is registered with passages 127 and 128. This permits bleeding from the left end of index cylinder 84 through line 159, passage 128, the recess in cup 117, and passage 127 to atmosphere. Also inflow of air is permitted from line 129 into chamber 114 and thence through passage 126 and line 156 to the right end of index cylinder 84. Piston 83 (and connected parts) will thus be shifted to the left, away from the position illustrated in FIGURES 8 and 12, and to the position shown in FIGURE 11. As piston 83 approaches its extended position to the left, as shown in FIGURE 11, bleed valve 148 (FIGURE 12) is operated to bleed air through line 147 from the left-end of large passage 111 in valve 107b. Since poppet 139 of control valve 131 is then closed, such bleeding of air from the left end of passage 111 will effect shifting of spool 113 of valve 107b to the left thereby reversing the position of cup 117 and feeding air into the left end of cylinder 84 and bleeding air from the right end thereof. This causes the stop piston 83 and connected elements to assume their retracted positions to the right.

As described in detail in connection with FIGURES 8, 9 and 11, this to and fro shifting of rod 82 permits counterclockwise rotation of gear segment 29 and drum 10 through the angle required to position the drum for the next welding operation of bars 16.

At the same time that the above-described operation of indexing stop 13 is occurring, and due to the position of spool 113 of valve 107a to the right, as above stated, air is bled from the left end of index cylinder 47 through line 158, passage 128 of valve 107a, the recess in cup 117 thereof, and passage 127 to atmosphere. Air is also fed from line 129 into chamber 114 and through passage 126 and line 154 to the right end of index cylinder 47. The index piston 51 is then shifted to the left, causing element 56 (FIGURE 4) to bear against the second bar 16 in the top layer in bank 15 and move the same to the left onto drum 10. A feeding of the bank 15 thus occurs from rails 37 onto the drum 10, and through a distance precisely controlled by index stop means 13.

When indexing cylinder means 11 reaches an extended position, it operates the bleed poppet 151 (FIGURE 12) to effect bleeding of air through line 149 from the left end of large passage 111 of valve 107. The spool 113 of valve 107 is thus shifted to the illustrated left position. Air is then bled through lines 153 and 152 from the left end of each hold cylinder 58 and is fed through lines 157 to the right end of each hold cylinder. The hold pistons 59 are thus shifted to the left and, as shown in FIGURE 5, will cause elements 63 to bear against the end portions of the second bar 16 and urge the same against the previously welded end portions of the first bar (adjacent stop bar 165).

All of the parts are then in the positions shown in FIGURE 12, and welds 36 (FIGURE 6) are made between the end tabs 27 at the end of the second bar 16 and the portions of the end ring surfaces adjacent the first-welded end tabs.

After making of the welds, handle 136 of control valve 131 is shifted all the way to the right. The bleed poppet 139 is not, however, operated since its actuator 138 merely pivots upwardly. The poppet 141, on the other hand, is operated by ear 137 which comes to rest thereon and maintains the poppet 141 in open condition.

Opening of poppet 141 effects bleeding of air through lines 146 and 144 from the left end of passage 111 of valve 107a, and through lines 147 and 144 from the right and of passage 111 of valve 107. Bleeding of air from the valve 107a immediately effects, since poppet 139 is closed, shifting of spool 113 of such valve to the left. Air is then bled through line 154 from the right end of index cylinder 47, and is fed through line 158 to the left end of the index cylinder. The index piston 51 then shifts to the right, resulting in release and closing of poppet 151. During this right-shifting, the element 56 of the index cylinder means (FIGURE 4) merely pivots over the next upper bar 16 in the manner of a pawl.

As soon as poppet 151 is closed to prevent bleeding of air from the left end of passage 111 of valve 107, the bleeding of air from the right end of such passage, due to the continued open condition of poppet 141, effects shifting of spool 113 of valve 107 to the right. Air is then fed through lines 152 and 153 to the left ends of hold cylinders 58, and is bled through lines 157 from the right ends of such cylinders. The hold pistons 59 are then shifted to the right, effecting retraction of elements 63 (FIGURE 5) upwardly away from the positions illustrated.

All of the parts are thus returned to their initial positions, and a new cycle of welding may be commenced upon shifting of control valve handle 136 to the left.

The various valves 161 associated with cylinder 84 are adjusted so that piston 83 will move at about the same speed in both directions. However, the valves 161 associated with the index and hold cylinders 47 and 58 are so adjusted that pistons 51 and 59, respectively, will move slowly to the left as viewed in FIGURES 1 and 12, but will retract rapidly to the right. Speed of operation is thus assured, without causing bumping or hitting of the bars 16.

After there are tabs 27 welded in edge abutment along the entire outer end ring surfaces, latch mechanism 88 is operated to disengage index cylinder means 13 from gear segment 29. Also, clamps 32 are removed, and in operations where bank 15 is continuous it is cut at the appropriate place. It is then merely necessary to lift the end rings 14 and connected bars and tabs off of the welding fixture, and to repeat the operation for a second pair of end rings 14.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A welding fixture for use in welding a bank of zigzag connected bars to end elements, which comprises rotatable drum means, clamp means to mount said end elements in corresponding locations at opposite end portions of said drum means, rail means to movably support said bank adjacent said drum means and in a plane generally tangential thereto, push means to feed the bars of said bank toward and onto said drum means and to cause rotational movement of said drum means, index means to permit rotation of said drum means due to operation of said push means but only through a predetermined angle corresponding approximately to the width of one of said bars, means to effect conjoint operation of said push means and index means, hold means operative during intervals following conjoint operation of said push means and index means to hold the opposite ends of an individual bar in proper position for welding to said end elements, and a control and actuating system operatively interconnecting said push means, said index means and said hold means for effecting automatic operation of said push means and index means in alternation with said hold means.

2. The invention as claimed in claim 1, in which said index means includes a gear segment mounted on said drum means, and an escapment device associated with said gear segment to permit rotation of said drum means through a predetermined angular distance during each operation of said push means.

3. The invention as claimed in claim 1, in which said push means and hold means include fluid operated cylinders mounted over said rail means, pistons slidably mounted in said cylinders, and means connected to the rods of said pistons to engage the sides of said bars and shift the same in a direction from said rail means onto said drum means.

4. An automatic fixture for use in welding to a pair of generally semi-annular end rings a plurality of metal tabs, said tabs projecting outwardly from and having been previously welded to the opposite longitudinal ends of the jointed bar end portions in a two-layer bank of zigzag connected metal bars or rods, which comprises a drum having a pair of axially spaced end discs shaped to seat said bar end portions in such manner that said projecting tabs extend over the peripheral edge surfaces of said discs, clamp means to secure said end rings to said discs in such locations that said tabs extend thereover and adjacent thereto, journal means to mount said drum for rotation about a horizontal axis, feed rail means disposed tangentially of the upper side of said drum for supporting said bank of bars for feeding onto said drum, cylinder support means mounted over said feed rail means, push cylinder means mounted and said cylinder support means and including piston rod means movable to engage said bank and push the same along said feed rail means toward said drum and to thereby cause rotational movement of said drum, hold cylinder means mounted on said cylinder support means and including piston rod means movable to engage the end portions of a single bar in the upper layer thereof to hold the tabs thereon closely adjacent tabs previously welded to said end rings, index cylinder means to permit rotation of said drum in a given direction and through a predetermined angle during operation of said push cylinder means but to prevent rotatation of said drum in said given direction during operation of said hold cylinder means, pneumatic circuit means operatively interconnecting said push cylinder means, said hold cylinder means and said index cylinder means, and control valve means in said circuit means for effecting automatic operation of said push cylinder means and index cylinder means in alternation with said hold cylinder means.

5. The invention as claimed in claim 4, in which means are provided to adjust the position of said cylinder support means and thus of said push cylinder means and hold cylinder means.

6. The invention as claimed in claim 4, in which means are provided to disengage said index cylinder means from said drum in order to permit free rotation of said drum.

7. The invention as claimed in claim 4, in which said index cylinder means comprises a toothed segment mounted on said drum, an escapement device associated with said toothed segment, and a cylinder device to operate said escapement device.

8. The invention as claimed in claim 7, in which said escapment device and cylinder device are mounted on a generally horizontal support bar located beneath said drum and pivoted at one of its ends, and in which latch means are provided at the other end of said support bar to support the same alternatively at a first pivoted position in which said escapement device engages said toothed segment and at a second pivoted position in which said escapement device is clear of said toothed segment.

9. The invention as claimed in claim 8, in which the teeth of said segment are inclined from the radial, and means are provided to effect an adjustment of said first pivoted position in order to vary the overlap of said escapement device with the side wall of the teeth in said toothed segment.

References Cited by the Examiner

UNITED STATES PATENTS

| | | | |
|---|---|---|---|
| 1,325,325 | 12/1919 | Janke | 29—205 |
| 1,665,522 | 4/1928 | Barr | 29—205 |
| 2,442,426 | 6/1948 | Metcalf | 219—101 |
| 2,585,792 | 2/1952 | Kroener | 29—205 |
| 2,716,803 | 9/1955 | Shaw | 29—205 |
| 2,801,328 | 7/1957 | Clough et al. | 219—79 |

WILLIAM FELDMAN, *Primary Examiner.*

ARTHUR M. HORTON, *Examiner.*

F. J. LEES, S. W. ENGLE, M. C. KRUSE, *Assistant Examiners.*